United States Patent [19]
Tanabe et al.

[11] Patent Number: 5,119,369
[45] Date of Patent: Jun. 2, 1992

[54] PACKET SWITCH COMMUNICATION NETWORK USING PACKET HAVING VIRTUAL CHANNEL IDENTIFIER

[75] Inventors: Shirou Tanabe, Hachioji; Kenji Kawakita; Shinobu Gohara, both of Yokohama, all of Japan

[73] Assignee: Hitachi, Ltd., Tokyo, Japan

[21] Appl. No.: 547,216

[22] Filed: Jul. 3, 1990

[30] Foreign Application Priority Data
Jul. 5, 1989 [JP] Japan ................................ 1-171789

[51] Int. Cl.⁵ .......................... H04J 3/24; H04Q 11/04
[52] U.S. Cl. ....................................... 370/60; 370/94.1
[58] Field of Search ..................... 370/94.1, 60, 110.1, 370/94.3, 94.2, 60.1

[56] References Cited

U.S. PATENT DOCUMENTS

| | | | |
|---|---|---|---|
| 4,494,230 | 1/1985 | Turner | 370/60 |
| 4,884,263 | 11/1989 | Suzuki | 370/60 |
| 4,890,280 | 12/1989 | Hirata | 370/94.1 |
| 4,907,220 | 3/1990 | Rau et al. | 370/94.1 |
| 4,920,531 | 4/1990 | Isono et al. | 370/94.1 |
| 4,964,119 | 10/1990 | Endo et al. | 370/94.1 |

Primary Examiner—Benedict V. Safourek
Assistant Examiner—H. Kizou
Attorney, Agent, or Firm—Antonelli, Terry Stout & Kraus

[57] ABSTRACT

In a packet network which includes a plurality of packet switching stations and in which a packet including in its header portion a VPI (Virtual Path Indentifier) for identifying one of logical paths multiplexed on a transmission line and a VCI (Virtual Connection Identifier) for identifying one of logical connections multiplexed on one logical path is communicated between the switching stations, each switching station preliminarily designates a VCI to be given to a packet directed to that station when a logical connection is to be set up between that station and another station. When receiving an information packet from the other station, the each station makes access to header label conversion tables on the basis of a VCI included in the received packet to read internal routing information necessary for a packet switching operation and a VCI to be given to a packet to be delivered.

19 Claims, 9 Drawing Sheets

PACKET SWITCH COMMUNICATION NETWORK USING PACKET HAVING VIRTUAL CHANNEL IDENTIFIER

BACKGROUND OF THE INVENTION

The present invention relates to a network system including a packet switch, and more particularly to a packet network for communication using a virtual channel identifier and a packet switching system which is applied to such a packet network.

In high-speed packet communication represented by broad band ISDN (BISDN), a self-routing switching system has been proposed in which a processing for packet switching is realized by means of hardware in order to improve the transmission throughput in the network. An asynchronous transfer mode (ATM) using a packet having a fixed length is employed in one kind of self-routing switching system. In an ATM network as described in "A DYNAMICALLY CONTROLLABLE ATM TRANSPORT NETWORK BASED ON THE VIRTUAL PATH CONCEPT", GROBECOM '88, 39-2, a plurality of their own virtual path identifiers (VPI's) are multiplexed on one real transmission line and a plurality of logical connections between switching stations having their own virtual channel identifiers (VCI's) are multiplexed on each logical path or VPI, in order to economically use a real transmission line having a high data transmission rate and to transmit a communication packet with an excellent reliability. A logical connection between two terminal units communicating with each other through at least one switching station is identified in each switching station by virtue of the combination of VPI and VCI included in the header portion of a received packet, thereby performing a packet switching operation.

One example of an ATM switch using a self-routing switch developed for application to the ATM network has been reported by, for example, "Asynchronous Transfer Mode Experimental switching System for Broad Band ISDN", Institute of Electronics, Information and Communication Engineers Technical Report, SSE88-29. In the ATM switch according to this Publication, a label conversion unit, having a label conversion table, is placed at the front stage of the self-routing switch so that a reference to the label conversion table is made in accordance with a connection identifier included in the header portion of each received packet to read routing information and a new connection identifier is preliminarily set or written in the label conversion table and is used in the switch, thereby performing the conversion of the label (header) of the received packet. In the above system, however, if VPI and VCI which comprise an identifier for identifying a call are used as an address of the label conversion table as they are, there arises a problem that the capacity of the label conversion table becomes considerably large.

Figure 1:
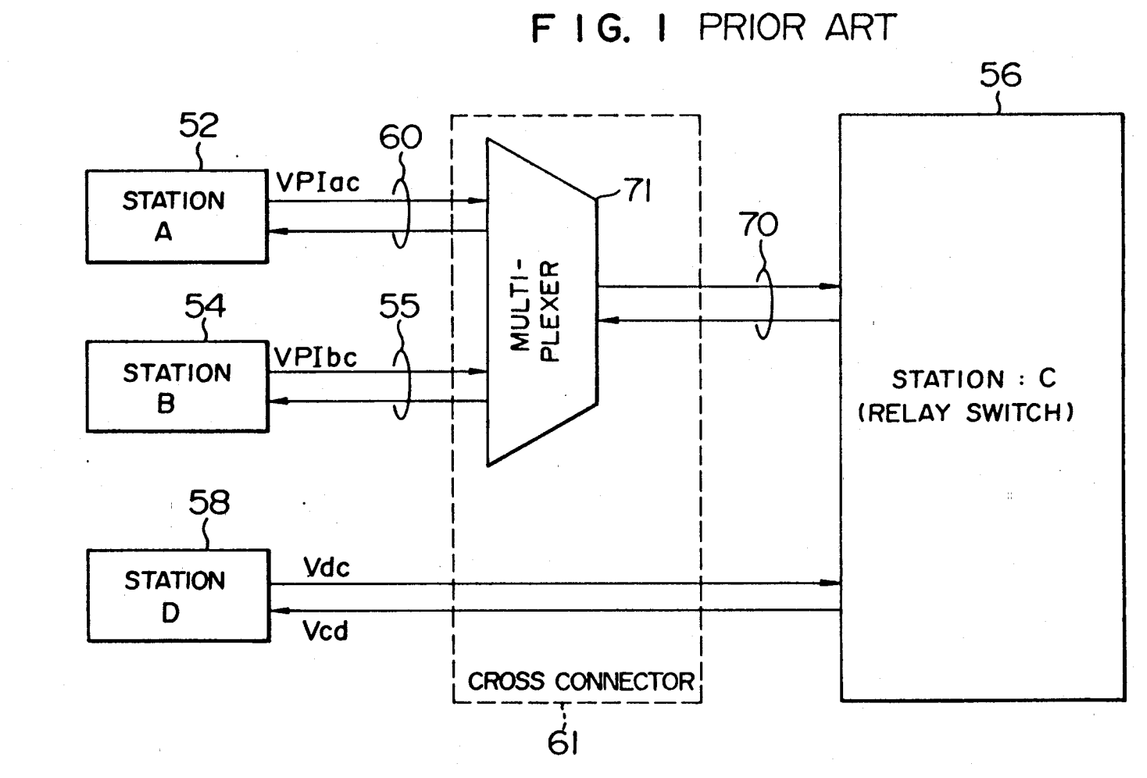
FIG. 1 is a block diagram showing an example of a packet network configuration to which the present invention is applicable.

For example, in the case where a line 60 connected to an A station 52 having a virtual path identifier $VPI_{ac}$ and a line 55 connected to a B station 54 having $VPI_{bc}$ are multiplexed by a multiplexer 71 in a cross connector 61 so that they are inputted to a relay switch (or C station) 56 through one line 70, as shown in FIG. 1, it is necessary to refer to both VPI and VCI included in the header portion of each received packet in order that the switch 56 identifies a logical connection on the line 70. For example, if the length of a VPI field of the packet header is 12 bits and the length of a VCI field is 16 bits, a label conversion table having an address capacity of $2^{28} = 256$ Mbits is required in the switch 56. This means that the total memory capacity of the label conversion table amounts to the order of G bits. Therefore, it is difficult to realize such a switching network.

Also, in the self-routing switch, it is necessary to preliminarily set routing information RT representative of the output line number of the switch in addition to ordinary packet information for each packet in order to switch an input packet to an output line coincident with a logical connection. In the conventional switch, the addition of the routing information RT gives rise to a problem that the length of a packet in the switch becomes large and hence an improvement in the data processing speed in the switch (or a speed conversion) is required in order to ensure the same throughput at the input and output sides of each switch.

SUMMARY OF THE INVENTION

An object of the present invention is to provide a packet switch system and a packet switching method in which the capacity of a table memory for conversion of the header of a received packet can be reduced even if a plurality of logical paths are multiplexed on the same transmission line.

Another object of the present invention is to provide a packet communication network which is capable of making the size of a packet transmitted in a switch and the size of a packet transmitted on a line outside the switch identical with each other.

To attain the above object, one feature of a packet switch network according to the present invention lies in that an information transfer logical connection, using an asymmetrical VCI having a value which differs depending on the direction of transmission of the information packet, is formed between two switching stations which communicate with each other. In this case, any given one of the switching stations upon call set-up designates to the preceding or succeeding switching station the value of the VCI which the preceding or succeeding station is to give to an information packet directed to the given station from the preceding or succeeding station. Namely, in the present invention, each of the switching stations forming the network operates so as to receive a packet which has in a header portion thereof a VCI which it has designated for itself (or that switching station) and to deliver a header label converted packet which includes a VCI designated by that other switching station. Accordingly, for example, in the network, as shown in FIG. 1, in which a packet delivered from the A station 52 and a packet delivered from the B station 54 are inputted to the C station 56 in a form in which the packets are multiplexed on the common transmission line 70, the present invention allows the C station 56 to determine the VCI which is to be given to a packet it receives at every call so that the packet received from the A station 52 and the packet received from the B station 54 always have different VCI's, thereby making it possible to identify a logical connection of each packet using only the VCI. As a result, the address capacity of a label conversion table necessary for rewrite of a header label of the received packet can be limited to the number of VCI's (for example, $2^{16} = 64K$).

Another feature of the present invention lies in that a packet label converting function at each switching station is divisionally arranged at the inlet and the outlet rear of a switch unit so that an incoming line interface functions to remove a VPI which is included in a packet received from the preceding switching station and which becomes unnecessary for a packet switching operation in the switch, and thereinstead inserts routing information RT used in the switch. In addition, an outgoing line interface inserts a VPI again into a packet to be delivered after the packet switching operation has been completed. For example, an internal VCI and routing information used in the switch are set in an input side label conversion table, and a VCI and a VPI for the outgoing line are set in an output side label conversion table. In the input side, a VCI is converted into the internal VCI while the routing information for the switch is set to a VPI field of the packet header. In the output side, the internal VCI is converted into the VCI for the outgoing line while the VPI is inserted into the packet header in place of the routing information.

With the above construction, since it is possible to make the sizes of packets inside and outside the switching station identical with each other, it is not necessary to provide a specific speed conversion function for absorbing a difference in packet length.

The foregoing and other objects, advantages, manner of operation and novel features of the present invention will be understood when reading the following detailed description in connection with the accompanying drawings.

DESCRIPTION OF THE PREFERRED EMBODIMENTS

Figure 2:
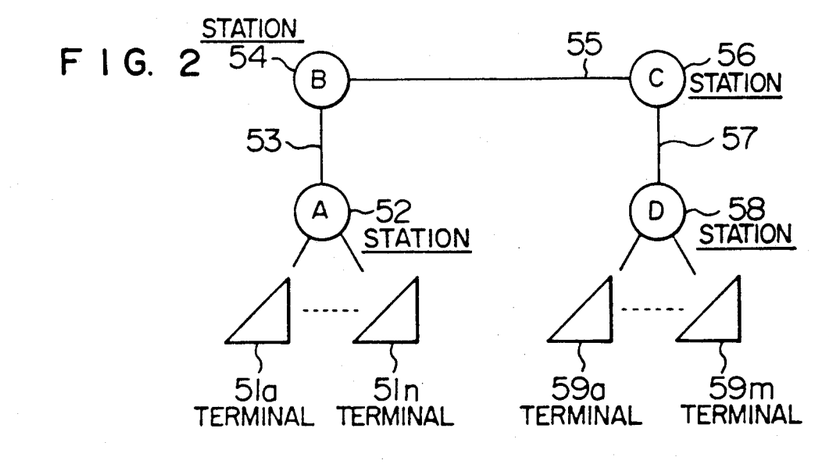
FIGS. 2, 3A and 3B are diagrams for explaining examples of the general construction of a network to which the present invention is applicable.

FIG. 2 shows the general construction of a network to which the present invention is applicable. The network for making a connection between terminal 51 (51a to 51n) and terminals 59 (59a to 59m) includes local switches 52 and 58 for accommodating the terminals 51 and 59, a relay line 55, and relay stations 54 and 56 for coupling the relay line 55 between the local switches 52 and 58 to enhance the traffic processing efficiency.

Figure 3A:
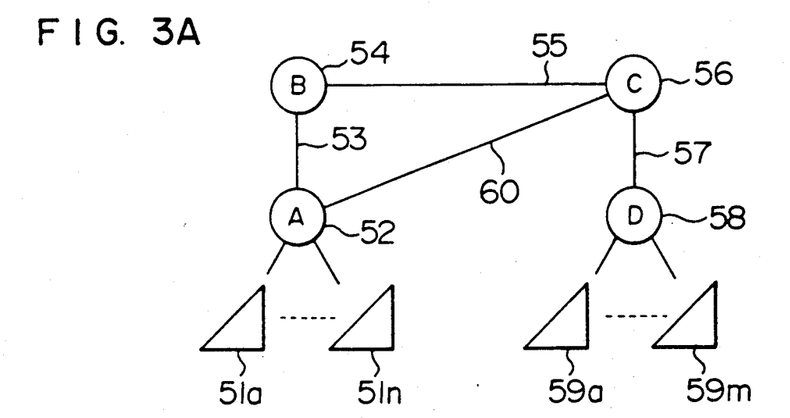

As regards a high-traffic route, a line 60 may be additionally provided between the switches 52 and 56, as shown in FIG. 3A, thereby reducing the load of the relay station 54.

Figure 3B:
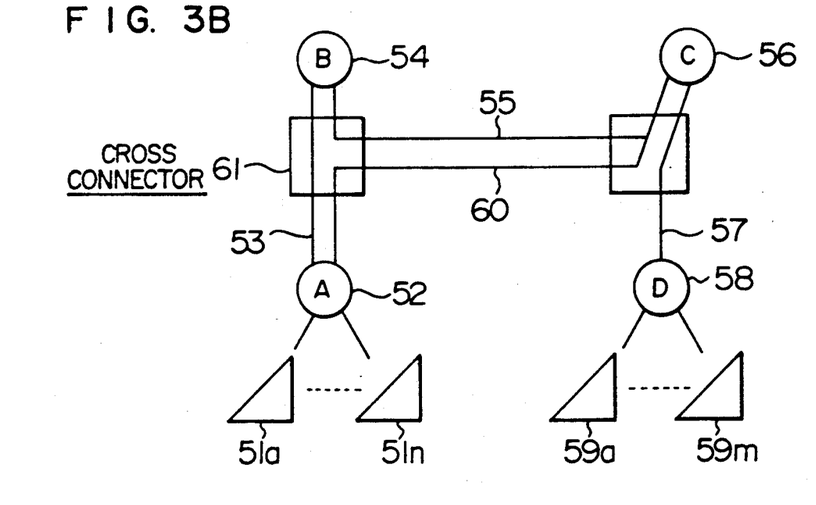

FIG. 3B shows an example of a physical line construction for realizing the network shown in FIG. 3A. In this example, a transmission line including the lines 60, 53 and 55 is provided and is distributed by a cross connector 61 to a line which arrives at the relay station (or B station) 54 and a line which makes a relay to the relay station (or C station) 56. In the packet network, a unit for identifying a group of logical lines having the same packet transmission direction is given as a virtual path indicator or identifier (VPI) to a packet header. The VPI is defined for each line and in each direction thereof, as ($VPI_{ab}$, $VPI_{ba}$) for the line 53, ($VPI_{bc}$, $VPI_{cb}$) for the line 55 and ($VPI_{ac}$, $VPI_{ca}$) for the line 60 in FIG. 3B. The cross connector 61 distributes each received packet to one of the output paths by virtue of the VPI.

FIG. 1 corresponds to FIG. 3B and shows the cross connector 61 in more detail. The line $VPI_{ac}$ from the A station 52 and the line $VPI_{bc}$ from the B station 54 are packet-multiplexed in the cross connector 61 and are thereafter inputted to one line of the C station 56.

Figure 4:
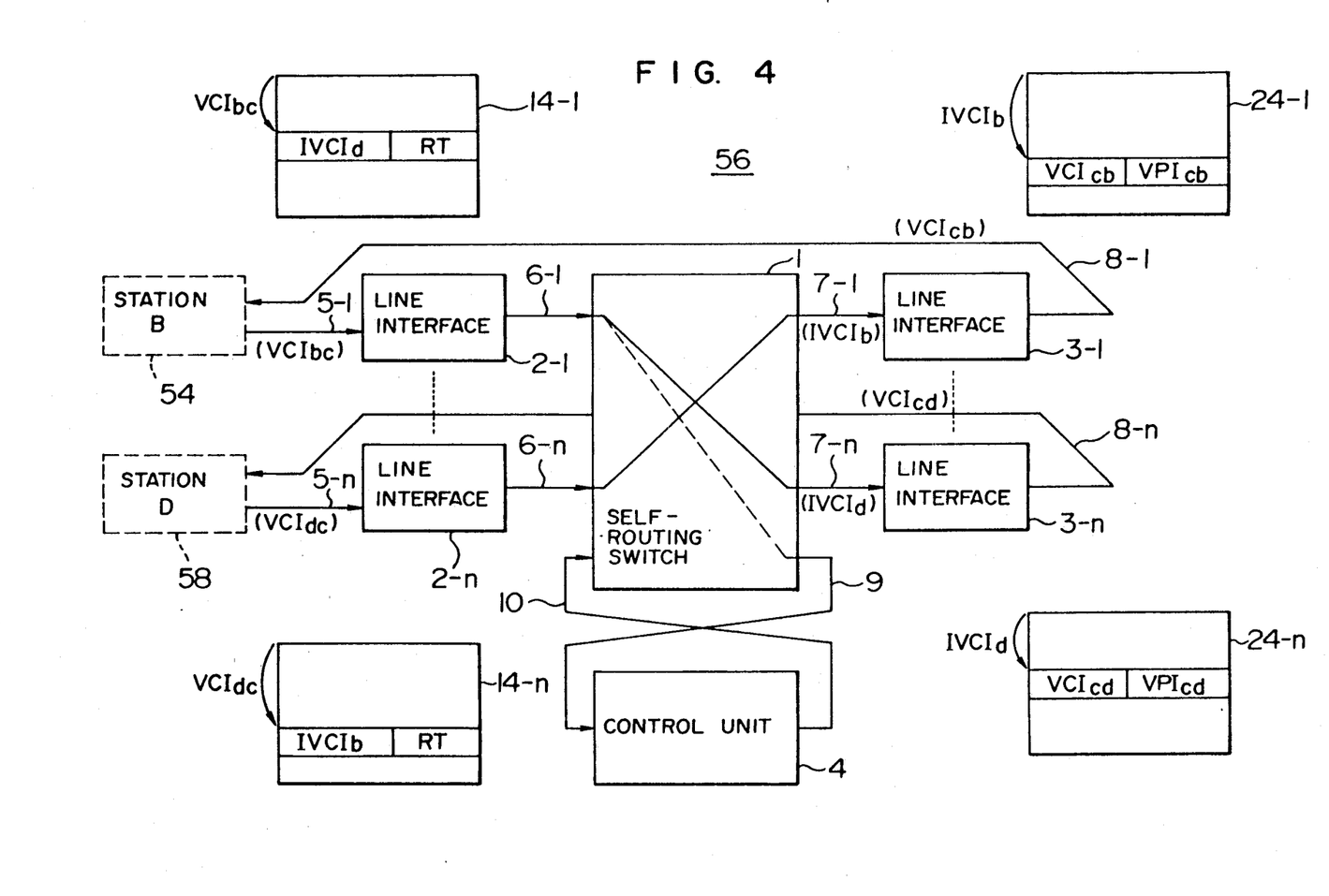
FIG. 4 is a block diagram showing the overall construction of a packet switch according to the present invention.

FIG. 4 shows an example of the construction of a self-routing switch system 56 to which the present invention is applied. The present switch system includes a self-routing switch 1 which accommodates n lines therein and performs a packet switching operation. A plurality of incoming line or input side interfaces 2 (2-1 to 2-n) are respectively provided for respective incoming lines 5 (5-1 to 5-n) and outgoing line or output side interfaces 3 (3-1 to 3-n) are respectively provided for outgoing lines 8 (8-1 to 8-n). A control unit 4 performs call processing. Each incoming line interface 2-i is provided at the incoming side of the self-routing switch 1 with an input thereof being connected to one incoming line 5-i and with an output thereof being connected to an input line 6-i of the self-routing switch 1. By virtue of an input side label conversion table 14-i, each incoming line interface 2-i has a function of converting a virtual channel identifier VCI (or first VCI) in the header portion of an input packet into an internal VCI (IVCI) which is used in the switch and is provided in correspondence to each of the output lines of the self-routing switch 1. The incoming interface 2-i also inserts routing information RT indicative of an output line number of the switch 1 into the header portion of the packet. Each outgoing line interface 3-i is provided at the outgoing side of the self-routing switch 1 with an input thereof being connected to the output line 7-i of the switch 1 and with an output thereof being connected to the outgoing line 8-i. By virtue of an output side label conversion table 24-i, each outgoing line interface 3-i has a function of converting the IVCI into an outgoing VCI (or second VCI) and of inserting a virtual path identifier (VPI) into the header in place of the routing information RT. Instead of using the internal VCI (IVCI), the first VCI may be used as an address to read the second VCI. The control unit 4 has an input connected to one output line 9 of the switch 1 and an output connected to one input line 10 of the switch 1.

Figure 5A:
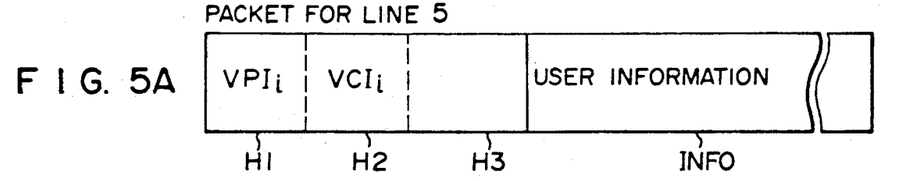
FIGS. 5A to 5C are views for explaining the format of an information packet and a header conversion performed by a switch.
Figure 5B:
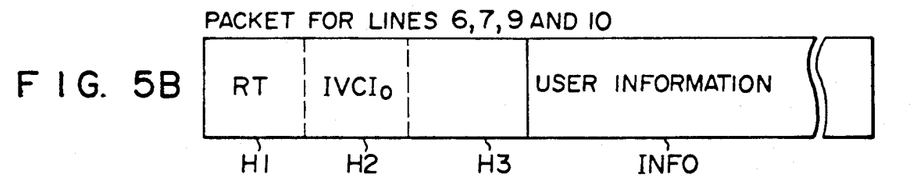
Figure 5C:
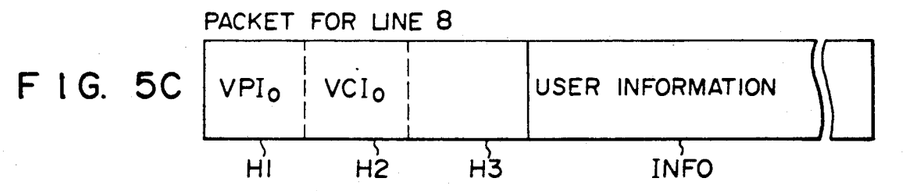

FIGS. 5A to 5C show the formats of signal packets for general information. The packet is composed of a header portion H (H1 to H3 fields) and an information portion or user portion INFO. A packet inputted from the incoming line 5-i to the line interface 2-i includes an incoming VPI ($VPI_i$) in an H1 field and an incoming VCI ($VCI_i$) in an H2 field, as shown in FIG. 5A.

A packet flowing on the signal lines 6, 7, 9 and 10 includes a number (or routing information) RT indicative of the output line 7-j or 9 of the switch 1 in an H1 field and an internal VCI ($IVCI_o$) corresponding to the output line 7-j or 9 in an H2 field, as shown in FIG. 5B.

A packet outputted from the line interface 3-j to the outgoing line 8-j includes an outgoing VPI ($VPI_o$) in an H1 field and an outgoing VCI ($VCI_o$) in an H2 field, as shown in FIG. 5C.

In the example shown in FIG. 4, the switch 56 corresponds to the C station shown in FIG. 3B, $VCI_i$ and $VPI_i$ of the incoming line 5-1 connected to the B station 54 are assumed as $VCI_{bc}$ and $VPI_{bc}$ respectively, $VCI_i$ and $VPI_i$ of the incoming line 5-n connected to the D station 58 are assumed as $VCI_{dc}$ and $VPI_{dc}$ respectively, $VCI_o$ and $VPI_o$ of the outgoing line connected to the B station 54 are assumed as $VCI_{cb}$ and $VPI_{cb}$ respectively, and $VCI_o$ and $VPI_o$ of the outgoing line 8-n connected to the d station 58 are assumed as $VCI_{cd}$ and $VPI_{cd}$ respectively.

Figure 6A:
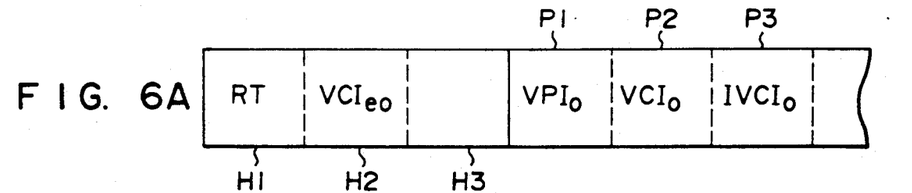
FIGS. 6A and 6B are views for explaining the formats of control signal packets used for updating of label conversion tables in a switch.
Figure 6B:
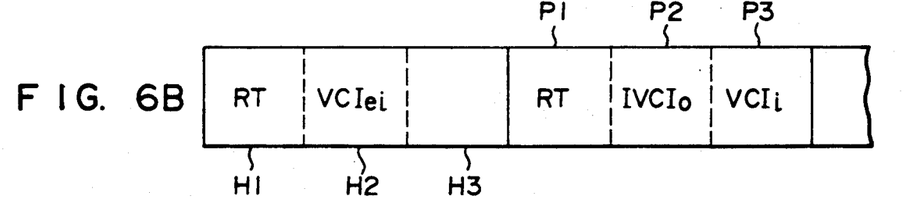

FIGS. 6A and 6B show the formats of internal control signal packets generated by the control unit 4. FIG. 6A shows the format of a packet for setting (or write) of data to the output side label conversion table 24. An H1 field is set with an output line number RT, an H2 field is set with $VCI_{eo}$ allotted to the output side label conversion table, and fields P1, P2 and P3 of a user portion are respectively set with $VPI_o$ and $VCI_o$ to be written in the output side label conversion table 24 and an write address $IVCI_o$ of the output side label conversion table. FIG. 6B shows the format of a packet for setting (or write) of data to the input side label conversion table 14. An H1 field is set with an outgoing line number RT, and H2 field is set with $VCI_{ei}$ allotted to the input side label conversion table, and fields P1, P2 and P3 are respectively set with rT and $IVCI_o$ to be written in the input side label conversion table and a write address $VCI_i$.

Figure 7:
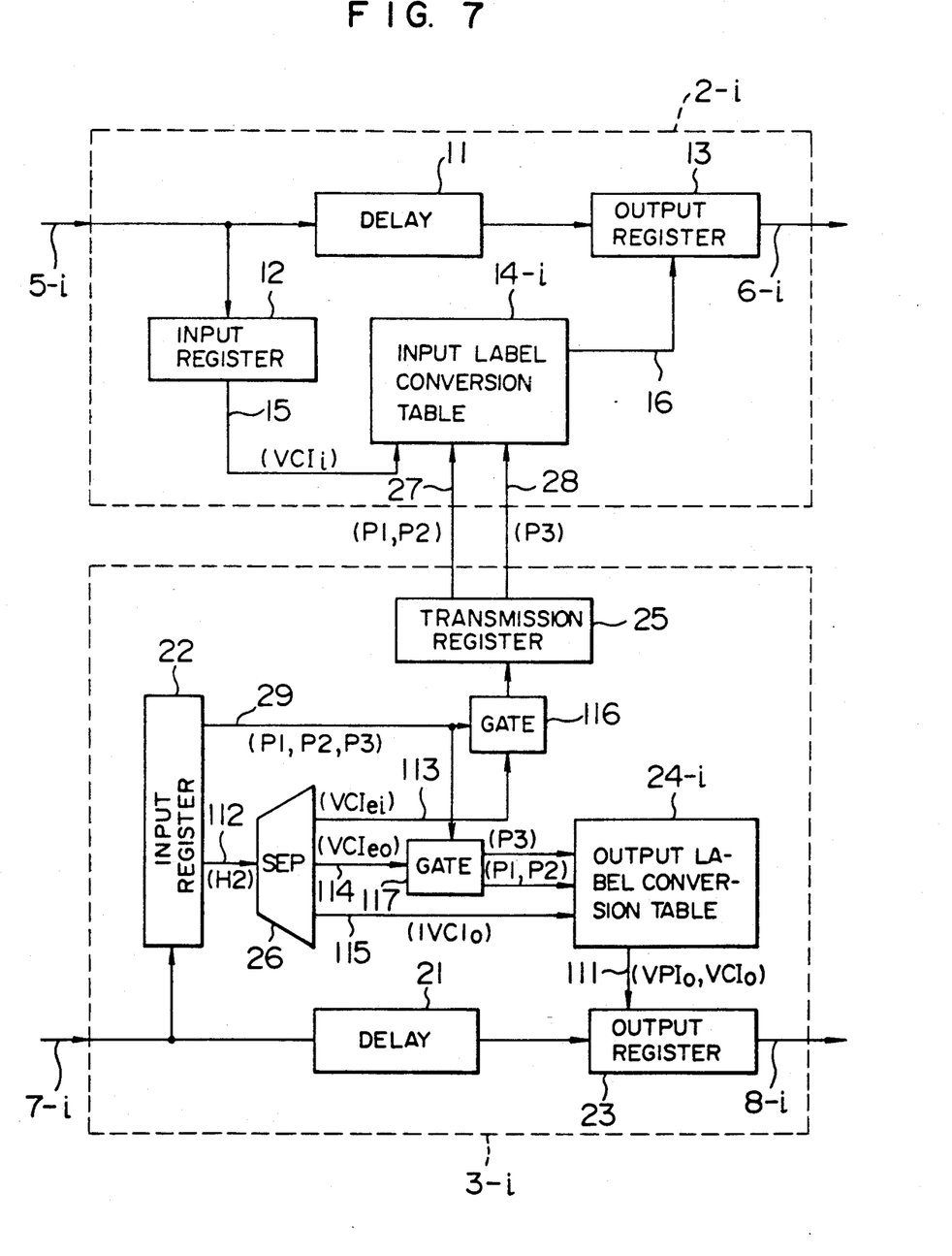
FIG. 7 is a block diagram showing an example of the construction of an incoming line interface 2-i and an outgoing line interface 3-i shown in FIG. 4.

FIG. 7 shows the details of the incoming line interface 2-i and the outgoing line interface 3-i.

Referring to FIG. 7, the incoming line 5-i is connected to an input register 12 and through a delay circuit 11 to an output register 13. The VCI of an information packet inputted to the input register 12 is taken from the H2 field of the input packet into a signal line 15 and is inputted as a read address to an input side label conversion table 14-i. A data output line 16 of the input side label conversion table 14-i is connected to the output register 13, an output of which is inputted to the self-routing switch 1 through a signal line 6-i.

On the other hand, the output line 7-i of the switch 1 is connected to an input register 22 and through a delay circuit 21 to an output register 23. The contents of the H2 field in the information packet inputted to the input register 22 are inputted to a separator circuit 26 through a signal line 112. In this case, since the received packet is a general information packet (see FIG. 5B), $IVCI_o$ is outputted from the separator circuit 26 to a read address line 115 so that $VPI_o$ and $VCI_o$ corresponding to $IVCI_o$ are read from the output side label conversion table 24-i onto a data line 111 and the output register 23 outputs to an outgoing line 8-i a header-converted packet which has a format as shown in FIG. 5C.

Where the received packet is a control packet, the contents of the P1 to P3 fields in the inputted packet are outputted from input register 22 onto a signal line 29. The separator circuit 26 outputs an enable signal to a signal line 113 in the case where the contents of the H2 field are $VCI_{ei}$ or to a signal line 114 in the case where the contents of the H2 field are $VCI_{eo}$, so that a gate 116 or a gate 117 is open. Thereby, in the case where a packet received from the switch 1 is a control packet for setting of data into the input side label conversion table (see FIG. 6B), the contents (RT, $IVCI_o$, $VCI_i$) of the P1 to P3 fields of the received packet are inputted through the gate 116 to transmission register 25 from which $VCI_i$ is outputted to a write address line 28 of the input side label conversion table 14-i and RT and $IVCI_o$ are outputted to a data line 27, thereby effecting the setting of table data, as shown in the tables 14-1 to 14-n of FIG. 4. In the case where the received packet is a control packet for setting of data into the output side label conversion table (see FIG. 6A), the contents ($VPI_o$, $VCI_o$) of the P1 and P2 fields are inputted to a data line of the output side label conversion table through the gate 117 and the contents ($IVCI_o$) of the P3 field are inputted to a write address line of the output side label conversion table, thereby effecting the setting of table data, as shown in the tables 24-1 to 24-n of FIG. 4.

Figure 8:
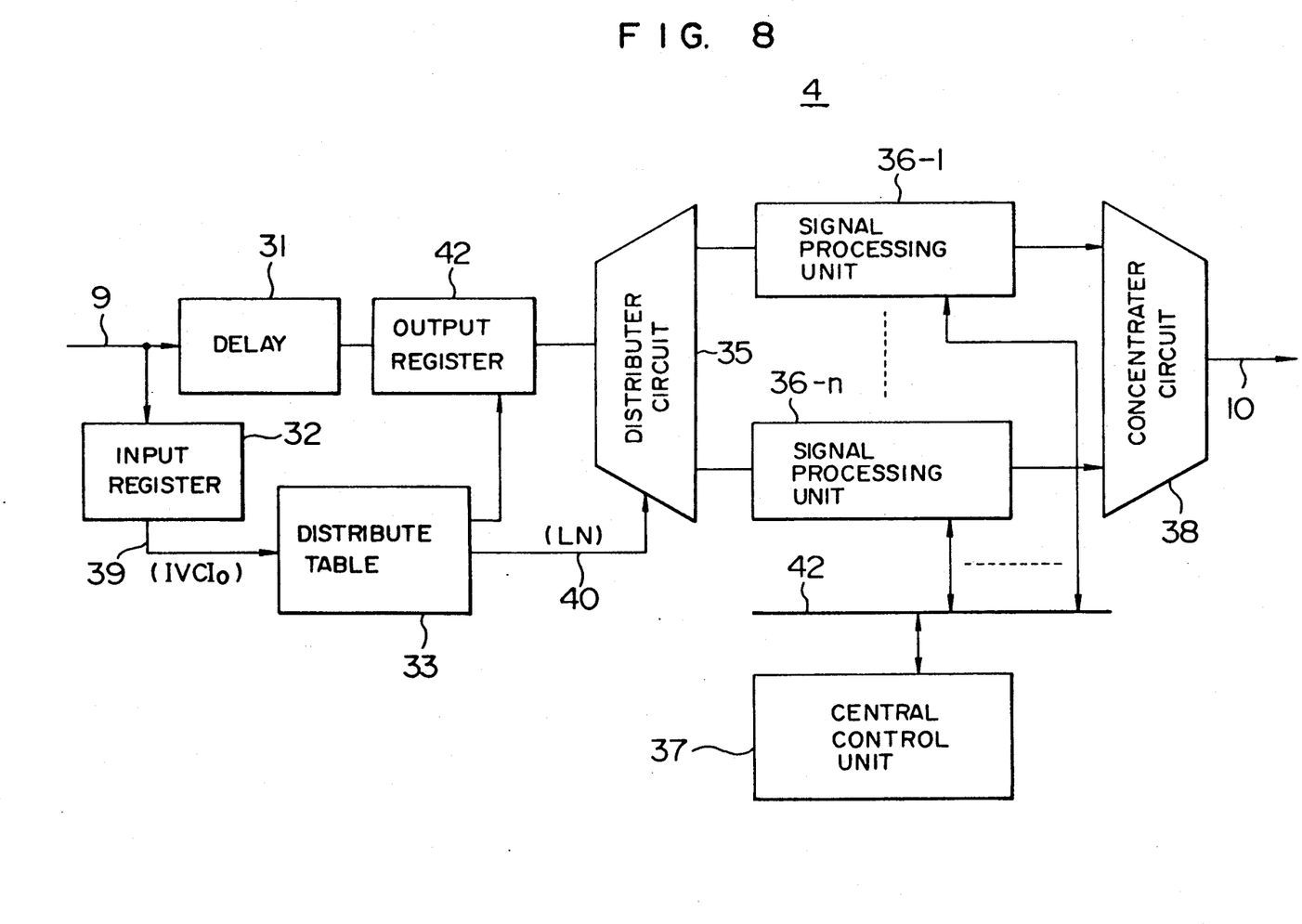
FIG. 8 is a block diagram showing an example of the construction, of a control unit 4 shown in FIG. 4.

FIG. 8 shows the details of the construction of the control unit 4 shown in FIG. 4. The input line 9 is connected to an input register 32 and through a delay circuit 31 to an output register 42. IVCI extracted from the H2 field in a received packet (see FIG. 5B) inputted to the input register 32 is inputted as a read address to a distribute table 33 through a signal line 3. An incoming line number LN corresponding to $IVCI_o$ which the line interface 2-i gives to the packet directed to the control unit is stored in the table 33 and LN read from the table 33 is inputted to a distributer circuit 35 through a signal line 40. The distributer circuit 35 inputs the received packet outputted from the output register 42 to one of a plurality of signal processing units 36-1 to 36-n provided in one-to-one correspondence to an incoming line 5 selected in accordance with LN. Outputs of the signal processing units 36-1 to 36-n are concentrated by a concentrater circuit 38 and are connected to the input line 10 of the switch 1. Each signal processing unit is connected through a bus 42 to a central control unit 37 which performs a call processing.

Next, the operation of the above-mentioned packet switching system according to the present invention will be explained in reference with FIGS. 9 to 11.

Figure 9:
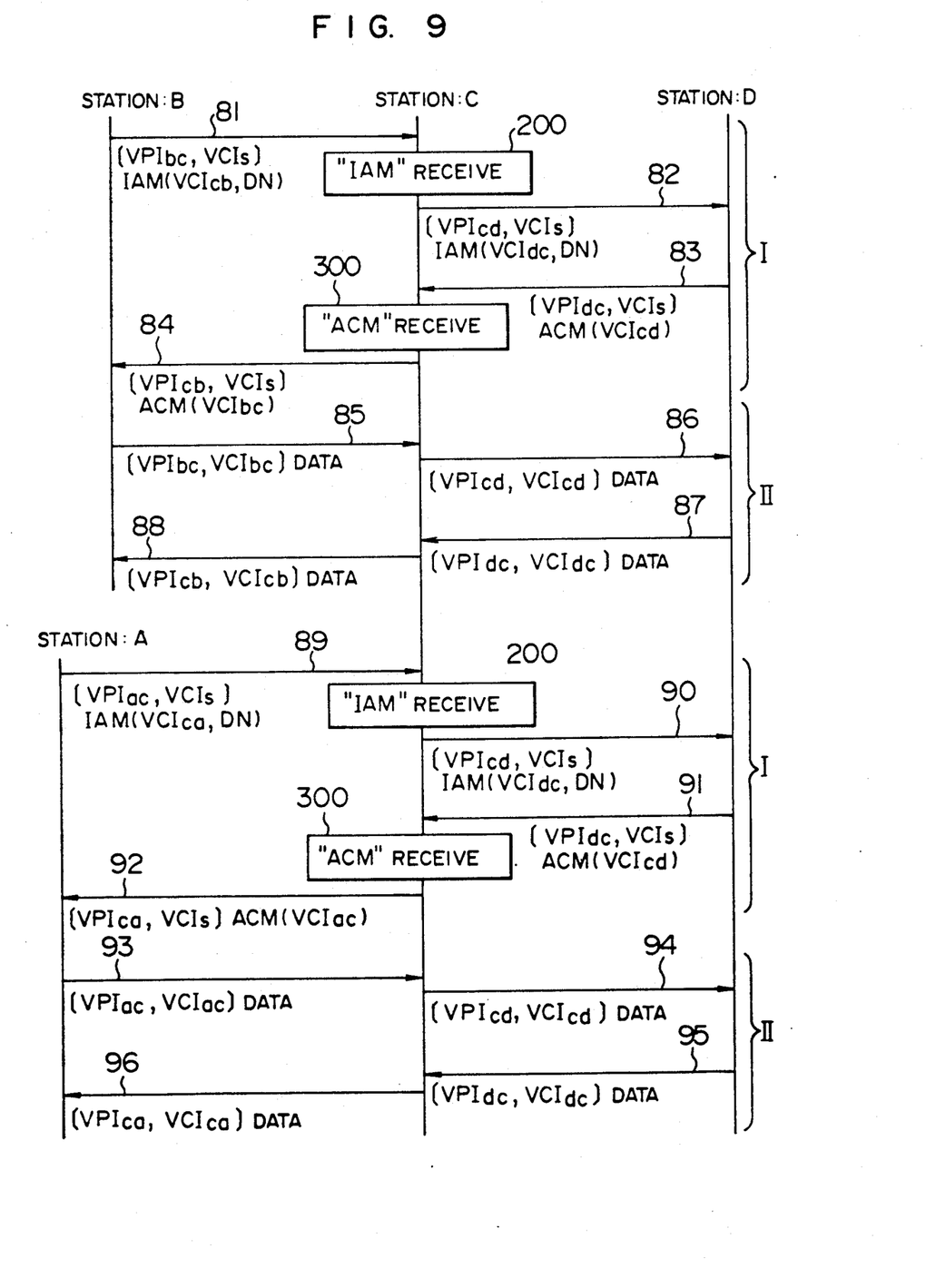
FIG. 9 is a view showing an example of a packet communication sequence according to the present invention.

Stations A, B, C and D in FIG. 9 correspond to the stations 52, 54, 56 and 58 in FIG. 3B. The switching operation of the C station will be explained on the basis of an example of a signal sequence for a call which arrives at the C station through the relay line 55 from the B station and thereafter goes to the D station and a call which arrives at the C station through the oblique line 60 from the A station and thereafter goes to the D station.

When a call going to the D station through the C station is generated at the B station, the B station transmits to the C station an initial address message (signal packet) (IAM) 81 which is a signal to request a call set-up. In the signal notation in FIG. 9, values in the H1 and H2 fields of a header portion are shown in a brackets [] and a parameter included in an information portion INFO are shown in parenthesis (). Accordingly, the signal packet IAM 81 includes $VPI_{bc}$ and $VCI_s$ allotted to the signal packet in the header portion and includes $VCI_{cb}$ (the VCI to be used by station C when communicating with station B) and a dial number DN as the parameters in the information portion. In the following, the operation of the C station 56 upon and after arrival of the IAM 81 at the C station 56 will be explained in succession.

Call Set-Up Phase: I

The IAM signal packet 81 is inputted to the line interface 2-1 from the line 5-1 (see FIG. 4) connected to the B station 54. In the line interface 2-1, the packet is inputted to the input register 12 shown in FIG. 7 so that $VCI_s$ extracted from the H2 field of the packet header portion is used as an address to make access to the input side label conversion table 14-1. In a memory region of the conversion table 14-1 at the address $VCI_s$ is set or written a record including RT indicative of the output line 9 to which the control unit 4 is connected and IVCI having a value which is allotted to the incoming line 5-1. RT and IVCI read from the table 14-1 through the above-mentioned access are supplied through the data line 16 to the output register 13 where they are inserted into the packet header portion. The self-routing switch 1 outputs the packet received from the input line 6-1 to the output line 9 in accordance with RT included in the header of the packet.

The packet arriving at the control unit 4 through the line 9 is inputted to the input register 32 (shown in FIG. 8) in which $IVCI_o$ is extracted from the H2 field of the header portion of the packet. The value of $IVCI_o$ is outputted onto the data line 39 and is used as an address to make access to the distribute table 33. The distribute table 33 outputs to the data line 40 an incoming line number LN which corresponds to IVIC given by the line interface 2-1. Based on the information (LN) supplied from the data line 40, the distributer circuit 45 distributes the packet to one of the signal processing units 36-1 to 36-n. The signal processing unit (36-1~36-n) performs a signal processing which includes, for example, a segmenting/reassembling process (or adaptation layering process) and LAPD (LINK Access Procedure on the D-Channel) and sends a message assembled from the received packet to the central control unit 37. Thereafter, an IAM receive processing program 200 at the central control unit 37 is activated.

Figure 10:
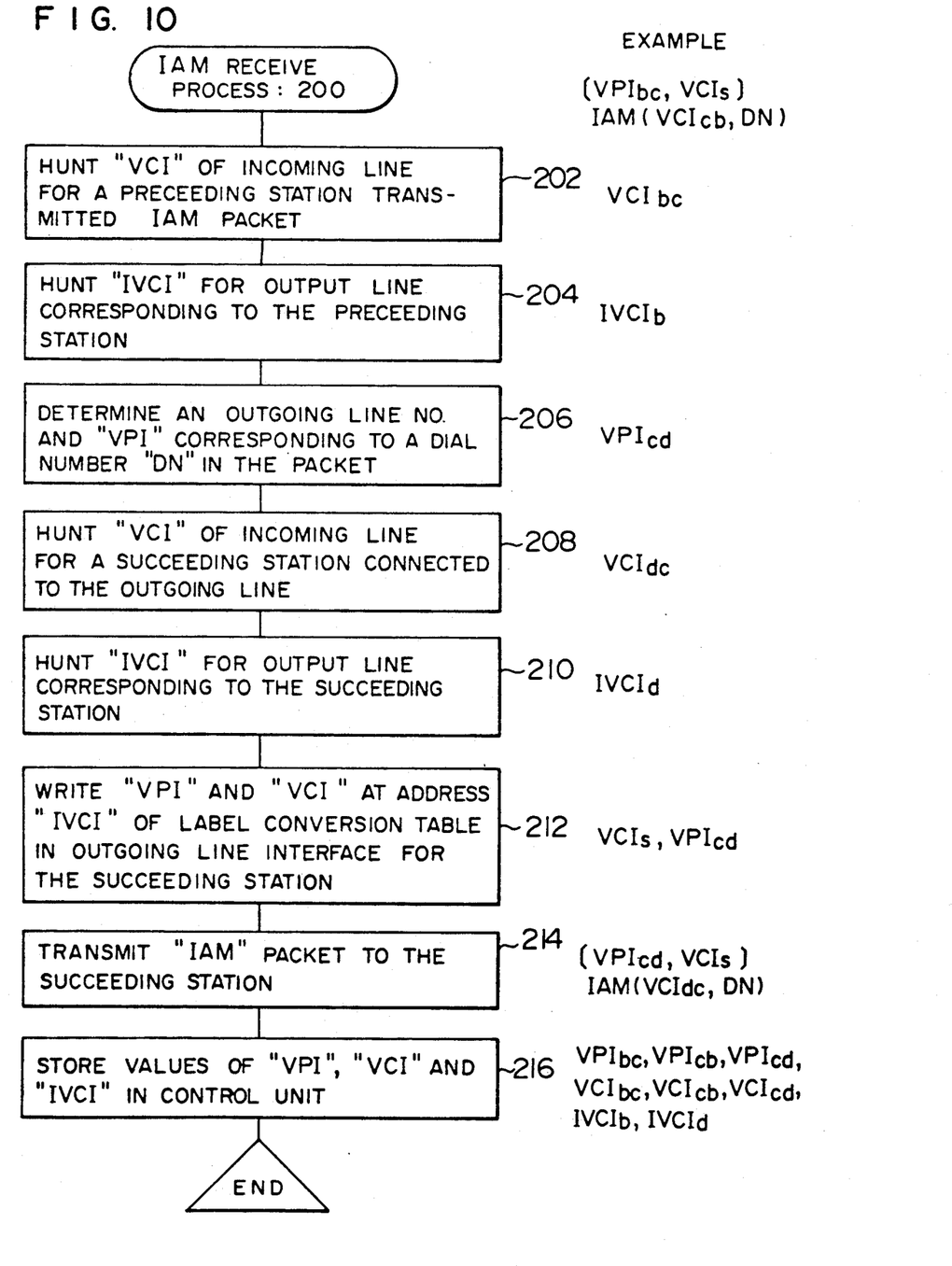
FIG. 10 is a flow chart showing a control operation sequence which the control unit 4 of the switch performs upon receiving an IAM signal packet in FIG. 9.

FIG. 10 shows the flow of a processing by the IAM receive processing program 200. In the IAM receive processing, vacant information ($VCI_{bc}$ in the shown example) for allotment to the incoming line 5-1 connected to the B station 54 which is a start station is hunted (step 202). Also, an internal VCI ($IVCI_b$ in the shown example) for outputting a packet to be directed to the B station to the output line 7-1 of the switch 1 is hunted (step 204).

Next, a dial number DN included as a parameter in the IAM signal packet is extracted and is subjected to numerical translation to determine an outgoing line number $VPI_{cd}$ (the outgoing line 8-n to the D station 58) (step 206). Further, information $VCI_{dc}$ to be allotted to the incoming line 5-n connected to the D station and paired with the outgoing line 8-n is hunted (step 208) and $IVCI_d$ for the output line 7-n of the switch 1 is hunted (step 210).

The completion of allotment of all of the above VCI, VPI and IVCI is followed by a processing for transmitting an IAM signal 82 to the D station. First, $VCI_s$ and $VPI_{cd}$ are set or written at an address IVCI of the output side label conversion table 24-n in the line interface 3-n of the outgoing line 8-n connected to the D station (step 212). This data setting operation is performed by transmitting an internal control signal packet (see FIG. 6A) from the control unit 4 to the line interface 3-n through the line 10, the switch 1 and the line 7-n. The H1 field of the internal signal packet is set with routing information RT indicative of the outgoing line 7-n, the P1 and P2 fields thereof are set with $VPI_{cd}$ and $VCI_s$ which are information to be written, and the P3 field thereof is set with IVCI which corresponds to an address of the label conversion table 24-n.

Next, the IAM signal packet 82 is transmitted to the D station (step 214). The IAM signal packet 82 includes, in its H1 and H2 fields, RT indicative of the output line 7-n of the switch 1 corresponding to the outgoing line 8-n connected to the D station and IVCI, respectively and the user portion INFO of the IAM signal packet is set with a signal name IAM, $VCI_{dc}$ as a parameter and DN which is a terminal number in the D station. The packet is inputted to the line interface 3-n through the line 10, the switch 1 and the line 7-n. In the line interface 3-n, the H2 field of the packet header portion is extracted in the input register 22 shown in FIG. 7 and the extracted value IVCI is inputted to the output side label conversion table 24 through the address line 115. Thereby, the conversion table 24 outputs $VPI_{cd}$ and $VCI_s$ to the output register 23 through the data line 111. The output register 23 inserts the received information ($VPI_{cd}$ and $VCI_s$) into the header portion of the IAM packet and transmits the header-converted IAM packet to the line 8-n connected to the D station.

Finally, the values of $VPI_{bc}$, $VPI_{cb}$, $VPI_{cd}$, $VCI_{bc}$, $VCI_{cb}$, $VCI_{dc}$, $IVCI_b$ and $IVCI_d$ are stored (step 216). $VPI_{cb}$ is determined by conversion from $VPI_{bc}$.

Figure 11:
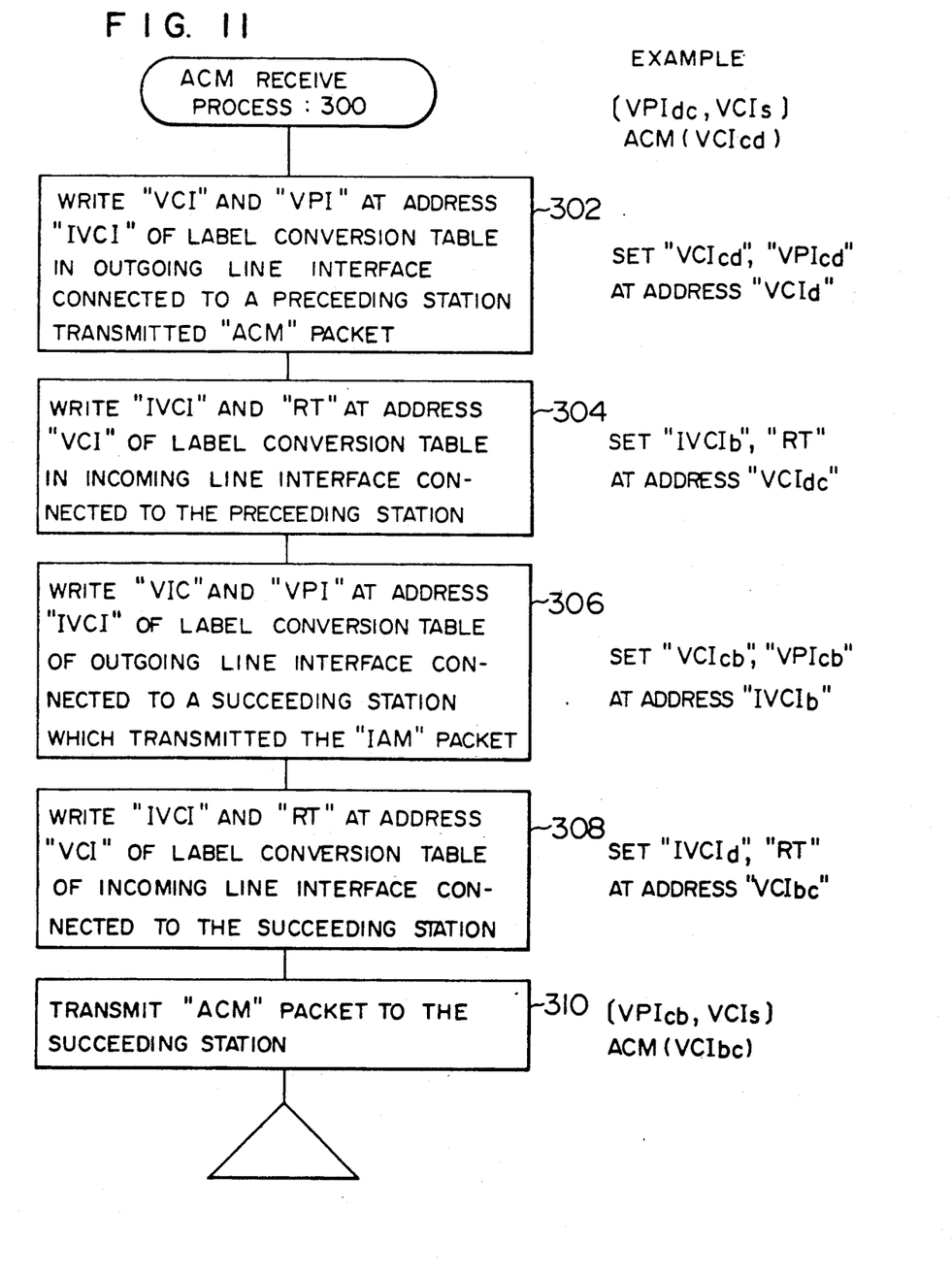
FIG. 11 is a flow chart showing a control operation sequence which the control unit 4 of the switch performs upon reception of an ACM signal packet.

In FIG. 9, when the C station 56 receives through the line 5-n a call set-up completion signal ACM (Address Complete Message) 83 (including $VPI_{dc}$ and $VCI_s$ in its header portion and information $VCI_{cd}$ indicative of the direction from the C station to the D station as a parameter in its user portion) outputted from the D station 58, the call set-up completion signal ACM 83 arrives at the control unit 4 through the line interface 2-n, the self-routing switch 1 and the line 9, line upon reception of the IAM signal, and an ACM receive processing program 300 shown in FIG. 11 is activated in the central control unit 37. In this case, since the call set-up completion signal ACM has been returned from the D station representing the destination of the call, the following processing is performed for call set-up between the C station and the B station and between the C station and the D station.

First, $VCI_{cd}$ and $VPI_{cd}$ are set at an address $IVCI_d$ of the output side label conversion table 24-n in the line interface 3-n of the outgoing line 8-n connected to the D station (step 302). The setting of data into the output side label conversion table 24-n is effected by transmitting an internal signal packet (having a format shown in FIG. 6A) from the control unit 4 to the line interface 3-n through the line 10, the switch 1 and the line 7-n. The H1 field of the internal signal packet is set with RT indicative of the output line 7-n connected to the line interface 3-n, the H2 field thereof is set with $VCI_{eo}$, the P1 and P2 fields thereof are set with $VPI_{cd}$ and $VCI_{cd}$, and the P3 field thereof is set with $IVCI_d$ which is an address of the table 24-n.

In the line interface 3-n, when the internal signal packet is received, $VCI_{eo}$ identified by the separator circuit 26 and P1, P2 and P3 from the input register 29 are inputted to the output side conversion table 24 through the gate 117. Thereby, in the label conversion table 24, the contents $VPI_{cd}$ of the P1 field and the contents $VCI_{cd}$ of the P3 field are set at the address indicated by $IVCI_d$ included in the P3 field.

Next, $IVCI_b$ and routing information RT indicative of the output line 7-1 corresponding to the B station are set at an address $VCI_{dc}$ of the input side label conversion table 14-n in the line interface 2-n connected to the incoming line 5-n from the D station (step 304). The setting of data to the input side label conversion table 14-n is made by transmitting an internal signal packet in a format shown in FIG. 6B from the control unit 4 to the outgoing line interface 3-n corresponding to the incoming line interface 2-n through the line 10, the switch 1 and the line 7-n. The H1 field of the resultant packet is set with RT indicative of the output line 7-n, the P1 and P2 fields thereof are set with RT indicative of the output line 7-1 corresponding to the B station and $IVCI_b$, and the P3 field thereof is set with a table address $VCI_{dc}$.

In the outgoing line interface 3-n, since $VCI_{ei}$ is identified by the separator circuit 25, the contents of the P1, P2 and P3 fields extracted by the input register 22 are inputted to the transmission register 25. Thereby, the contents RT of the P1 field and the contents $IVCI_b$ of the P2 field are set at an address $VCI_{dc}$ of the input side label conversion table 14. Similarly, $VCI_{cb}$ and $VPI_{cb}$ are set at an address $VICI_b$ of the output side label conversion table 24-1 in the outgoing line interface 3-1 connected to the B station (step 306), and $IVCI_d$ and RT indicative of the output line 7-n corresponding to the D station are set at an address $VCI_{bc}$ of the input side label conversion table 14-1 in the incoming line interface 2-1 connected to the B station (step 308).

Finally, an ACM signal packet 84 including $VPI_{cb}$ and $VCI_s$ in its header portion and $VCI_{bc}$ in its user portion is transmitted to the B station (step 310).

Information Transmit Phase: II

The following explanation will be made of the switching operation of the C station when a data packet 85 of a format of FIG. 5A having $VPI_{bc}$ and $VCI_{bc}$ in its header portion arrives at the C station from the B station after the call has been set up.

The packet 85 is inputted to the line interface 2-1 through the incoming line 5-1. Then, the H2 field of the received packet is extracted by the input register 12 shown in FIG. 7 and the value of the H2 field or an address $VCI_{bc}$ is supplied to the input side label conversion table 14-1 through the address line 15. Since $IVCI_d$ and the routing information RT indicative of the output line 7-n of the switch 1 are set at an address position of the conversion table 14-1 indicated by $VCI_{bc}$ upon call set-up, this information is read to the output register 13 through the data line 16 so that the received packet is subjected to header conversion to provide a format as shown in FIG. 5B. The packet arrives at the line interface 3-n through the self-routing switch 1 and the line 7-n in accordance with RT of the header portion. In the line interface 3-n, the H2 field of the received packet is extracted by the input register 22 shown in FIG. 7 and the value $IVCI_d$ of the H2 field is outputted as an address to the output side label conversion table 24-n through the signal line 112, the separator circuit 26 and the data line 115. Since $VCI_{cd}$ and $VPI_{cd}$ are set at an address of the conversion table 24-n indicated by $IVCI_d$ upon call set-up, this information is read to the output register 23 through the data line 111 and is inserted into the header portion of the packet 85 and the resultant packet is transmitted as a data packet 86 to the outgoing line 8-n connected to the D station.

In the case where a data packet 87 having $VPI_{dc}$ and $VCI_{dc}$ in its header portion arrives at the C station from the D station, the received packet is inputted to the incoming line interface 2-n through the incoming line 5-n, in a manner similar to that mentioned above. In the line interface 2-n, $VCI_{dc}$ extracted from the H2 field of the received packet 87 is supplied as an address to the input side label conversion table 14-n. Since $IVCI_b$ and the routing information RT indicative of the output line 7-1 are set at an address position of the conversion table 14-n by $VCI_{dc}$ upon call set-up, this information is read to the output register 13 through the data line 16 and is inserted into the header portion of the packet 87. The thus header-converted packet arrives at the outgoing line interface 3-1 through the self-routing switch 1 and the line 7-1 in accordance with RT of the header portion. In the line interface 3-1, $IVCI_b$ extracted from the H2 field of the received packet is supplied as an address to the output side label conversion table 24-1 through the signal line 112, the separator circuit 26 and the address line 115. Since $VCI_{cb}$ and $VPI_{cb}$ are set at an address position of the conversion table 24-1 indicated by $IVCI_b$ upon call set-up, this information is read to the output register 23 through the data line 111 and is inserted into the header portion of the received packet 87 and the resultant packet is transmitted as a data packet 88 to the outgoing line 8-1 connected to the B station.

Also, in the case where a start signal or call set-up requesting signal IAM 89 from the A station 52 arrives at the C station, an operation similar to the above-mentioned operation is performed for both a call set-up phase (I) and an information transmit phase (II), as shown by 90 to 96 in FIG. 9. However, even in the case of a network construction in which the line 60 from the A station and the line 55 from the B station are multiplexed and are inputted as one line to the switch, as shown in FIG. 1, $VCI_{ac}$ and $VCI_{bc}$ are different from each other since VCI of the receiving side is hunted among vacant VCI's in the IAM receive processing 200. Therefore, it is possible to identify a connection reference only to the VCI. For the above reason, each label conversion table in the switch can be constructed to have a number of addresses which corresponds only to the number of VCI's.

We claim:

1. A packet communication network having a plurality of interconnected packet communication stations, and in which a packet, including in its header portion a virtual channel identifier for identifying a logical connection which determines a transmission route of the packet, is communicated between the packet communication stations, at least one of said packet communication stations comprising:

means for determining, when a logical connection is set up between said one packet communication station and a second packet communication station, a first virtual channel identifier to be given to each information packet subsequently transmitted from said second packet communication station to said one packet communication station and informing said second packet communication station of said first virtual channel identifier by transmission of a control packet to said second packet communication station; and means for receiving from said second packet communication station and storing a second virtual channel identifier for use by said one packet communication station in each information packet subsequently transmitted from said one packet communication station to said second packet communication station.

2. A packet communication network according to claim 1, wherein said each information packet transmitted between packet communication stations includes in its header portion a virtual path identifier for identifying a logical path on which a plurality of multiplexed logical connections having the same packet transmission direction are formed, and wherein said one packet communication station further includes:

a plurality of incoming lines and a plurality of outgoing lines respectively connected to others of said packet communication stations including said second packet communication station;

switch means connected between said incoming lines and said outgoing lines for outputting an input packet received on one of said incoming lines to one of said outgoing lines in accordance with routing information inserted into the input packet; and label conversion means for inserting said routing information into an input packet received on one of said incoming lines and for removing said routing information from a packet outputted from said switch means to one of said outgoing lines, said routing information being determined in accordance with a virtual channel identifier included in the received input packet.

3. A packet network according to claim 2, wherein said label conversion means comprises a plurality of first label conversion means respectively provided for said incoming lines and a plurality of second label conversion means respectively provided for said outgoing lines;

each of said plurality of first label conversion means including first table means for storing routing information in correspondence to a virtual channel identifier included in each packet received from the incoming line connected to that first label conversion means and first control means for rewriting the virtual path identifier field included in each received packet with routing information read from said first table means and for inputting the resultant packet to said switch means; and each of said second label conversion means including second table means for storing a virtual path identifier and a virtual channel identifier which is to be inserted into an output packet to be sent to another packet communication station, and second control means for rewriting a virtual channel identifier field and a routing information field included in the packet outputted from said switch means with a virtual channel identifier and a virtual path identifier read from said second table means.

4. A packet network according to claim 3, wherein an internal virtual channel identifier is stored together with said routing information in each of said first table means in correspondence to each virtual channel identifier of an input packet, said first control means including means for rewriting the virtual channel identifier field and the virtual path identifier field included in a received input packet with an internal virtual channel identifier and routing information read from the first table means, a virtual path identifier and a virtual channel identifier being stored in each of said second table means in correspondence to a respective internal virtual channel identifier, and said second control means including means for reading one pair consisting of a virtual path identifier and a virtual channel identifier from said second table means in accordance with an internal virtual channel identifier included in a packet outputted from said switch means.

5. A method of communicating a packet in a network which includes a plurality of communication stations, the packet including in its header portion a virtual path identifier for identifying one of a plurality of logical paths multiplexed on one transmission line and a virtual channel identifier for identifying one of a plurality of logical connections multiplexed on one logical path, said method comprising, in at least one of the plurality of communication stations:

a first step of designating a first virtual channel identifier to be included in every information packet transmitted to said one communication station from a second communication station;

a second step of transmitting a control packet including said first virtual channel identifier to said second communication station for setting up a logical connection with said second communication station; and a third step of receiving from said second communication station and storing a second virtual channel identifier which is to be used in a virtual channel identifier field of any information packet which is generated by said one communication station and is transmitted to said second communication station.

6. A method of communicating a packet in a network which includes a plurality of switching stations, the packet including in its header portion a virtual path identifier for identifying one of a plurality of logical paths multiplexed on one transmission line and a virtual channel identifier for identifying one of a plurality of logical connections multiplexed on one logical path, said method comprising:

a first step of designating, by virtue of a first control packet transmitted from a first one of said switching stations to a second one of said switching stations for setting up a logical connection therebetween, a first virtual channel identifier to be given to information packets transmitted from said second station to said first station;

a second step of designating, by virtue of a second control packet transmitted from said second station to a third one of said switching stations for setting up a logical connection therebetween, a second virtual channel identifier to be given to information packets transmitted from said third station to said second station;

a third step of designating, by virtue of a third control packet transmitted from said third station to said second station for setting up a logical connection therebetween, a third virtual channel identifier to be given to information packets transmitted from said second station to said third station;

a fourth step of designating, by virtue of a fourth control packet transmitted from said second station to said first station for setting up a logical connection therebetween, a fourth virtual channel identifier to be given to information packets transmitted from said first station to said second station; and a fifth step of communicating between said first and third stations by (i) transmitting respective information packets with the fourth or second virtual channel identifier to said second station, (ii) converting in said second station the virtual channel identifier of the information packets received from said first or third station into said third or first virtual channel identifier.

7. A method according to claim 6, wherein said second switching station includes a plurality of incoming lines respectively connected to the other switching stations, input side interfaces respectively provided for said incoming lines, a plurality of outgoing lines respectively connected to said other switching stations, output side interfaces respectively provided for said outgoing lines, and a packet switch provided between said input side interfaces and said output side interfaces, wherein said second station performs the following steps between said first step and said fourth step:

storing first routing information for specifying one of the outgoing lines through which information packets transmitted from said third station are delivered to said first station, into a memory of one of the input side interfaces which received said third control packet from said third station, in correspondence to said second virtual channel identifier;

storing said first virtual channel identifier and a virtual path identifier to be set in said information packets destined for said first station, into a memory of one of the output side interfaces which is connected to the one outgoing line specified by said first routing information, in correspondence to said second virtual channel identifier;

storing second routing information for specifying one of the outgoing lines through which information packets transmitted from said first station are delivered to said third station, into a memory of one of the input side interfaces which receives said first control packet from said first station, in correspondence to said fourth virtual channel identifier; and storing said third virtual channel identifier and a virtual path identifier to be set in said information packets destined for said third station, into a memory of one of the output side interfaces which is connected to the one outgoing line specified by said second routing information, in correspondence to said fourth virtual channel identifier; and wherein said second station performs in said fifth step:

a first conversion step of reading out, in one of the input side interfaces which receives an information packet delivered from either one of said first or third stations, routing information corresponding to said second or fourth virtual channel identifier included in said received information packet from the memory of the input side interfaced and giving the routing information thus read out to a virtual path identifier field of said information packet;

a step of switching said information packet outputted from said input side interface to one of the output side interfaces in accordance with said routing information given to said information packet; and a second conversion step of reading out, in one of output side interfaces which receives said switched information packet, said virtual path identifier and said first or third virtual channel identifier corresponding to said second or fourth virtual channel identifier included in said switched information packet from the memory of said one output side interface and inserting the virtual path identifier and either one of said virtual channel identifiers thus read out into the virtual path identifier field and the virtual channel identifier field of said information packet, respectively.

8. A method according to claim 7, where:

in each of said storing steps performed in said input side interfaces an internal virtual channel identifier is stored together with said first or second routing information into the memory of said input side interface;

in each of said storing steps performed in said output side interfaces said virtual path identifier and said first or third virtual channel identifier are stored into the memory of said output side interface, in correspondence to said internal virtual channel identifier substituted for said second or fourth virtual channel identifier;

in said first conversion step performed in said input side interface the routing information and the internal virtual channel identifier are read out from the memory of said input side interface and said internal virtual channel identifier thus read out is given to the virtual channel identifier field of the information packet, and in said second conversion step performed in said output side interface the virtual path identifier and the first and third virtual channel identifier are read out corresponding to the internal virtual channel identifier included in said switched information packet.

9. A method of communicating by packets in a network system including a plurality of interconnected packet switching stations, each of said packets including in its header portion a virtual path identifier and a virtual channel identifier, said method comprising;

a first step of exchanging virtual channel identifiers between packet switching stations by sending from a receiving station to a sending station a virtual channel identifier which is to be set in each information packet sent from the sending station to the receiving station, during a process for establishing a call between packet switching stations; and a second step of communicating information packets between packet switching stations, each of which stations operates to transmit information packets with the virtual channel identifier designated by the receiving station in the first step.

10. A method of communicating a packet in a network including a plurality of switching stations, the packet including in its header portion a virtual path identifier for identifying one of a plurality of logical paths multiplexed on one transmission line and a virtual channel identifier for identifying one of a plurality of logical connections multiplexed on one logical path, said method comprising:

a first step of designating, by virtue of a first control packet transmitted from a first one of said switching stations to a second one of said switching stations for setting up a call therebetween, a first virtual channel identifier to be given to information packets transmitted from said second station to said first station;

a second step of designating, by virtue of a second control packet transmitted from said second station to said first station for setting up the call therebetween, a second virtual channel identifier to be given to information packets transmitted from said first station to said second station; and a third step of communicating information packets between said first and second stations by providing each information packet with the first or second virtual channel identifier designated by the receiving station of said two stations.

11. A method of communicating a packet in a network which includes a plurality of switching stations, the packet including in its header portion a virtual path identifier for identifying one of a plurality of logical paths multiplexed on one transmission line and a virtual channel identifier for identifying one of a plurality of logical connections multiplexed on one logical path, said method comprising:
- a first step of indicating, by virtue of a first control packet transmitted from a first one of said switching stations to a second one of said switching stations for setting up a call between said first station and a third one of said packet switching stations, a first virtual channel identifier to be given to information packets transmitted from said second station to said first station;
- a second step of designating, by virtue of a second control packet transmitted from said second station to a third station for setting up the call, a second virtual channel identifier to be given to information packets transmitted from said third station to said second station;
- a third step of designating, by virtue of a third control packet transmitted from said third station to said second station for setting up the call, a third virtual channel identifier to be given to information packets transmitted from said second station to said third station;
- a fourth step of designating, by virtue of a fourth control packet transmitted from said second station to said first station for setting up the call, a fourth virtual channel identifier to be given to information packets transmitted from said first station to said second station; and
- a fifth step of communicating between said first, second and third stations by transmitting information packets with one of said first, second, third and fourth virtual channel identifiers determined in accordance with the station to receiver the information packet.

12. A method according to claim 11, further comprising:
- a step of converting the fourth virtual channel identifier included in the information packet received from said first station into the third virtual channel identifier and transmitting the information packet to a transmission line connected to said third station at said second station;
- a step of converting the second virtual channel identifier included in the information packet received rom said third station into the first virtual channel identifier and transmitting the information packet to a transmission line connected to said first station at said second station.

13. A packet switching station for communicating with any one of a plurality of other stations by packets each including in its header portion a virtual channel identifier for identifying a logical connection which determines a transmission route of the packet, said packet switching station comprising:
- control means for performing a connection control operation which includes means for determining, when a first logical connection is set up between said packet switching station and a first one of the other stations, a first virtual channel identifier to be given to each information packet subsequently transmitted from said first station to said packet switching station by way of the first logical connection and for informing said first one station of said first virtual channel identifier by a control packet;
- memory means connected so as to communicate with said control means within said packet switching station, for storing a second virtual channel identifier in correspondence to a second logical connection when said first one station or a second one of the other stations informs said packet switching station of said second virtual channel identifier by a control packet for setting up said second logical connection between said packet switching station and said first one or second one station; and
- interface means connected to said memory means, for giving, when an information packet is transmitted from said packet switching station to said first or second one station through said second logical connection said second virtual channel identifier read out from said storing means to said information packet and delivering the resultant information packet onto an outgoing line to which said first or second one station is connected.

14. A packet switching station according to claim 13, wherein each packet includes in its header portion a virtual path identifier for identifying a logical path on which a plurality of multiplexed logical connections having the same packet transmission direction are formed, and wherein said packet switching station includes:
- a plurality of incoming lines and a plurality of outgoing lines respectively connected to the other stations;
- switch means, connected between said incoming lines and said outgoing lines, for outputting an input packet received from one of said incoming lines to one of said outgoing lines in accordance with routing information given to the input packet; and
- a plurality of label conversion means connected to said incoming lines and outgoing lines, each for giving routing information to an input packet received from one of said incoming lines connected thereto so that the resultant packet is applied to said switch means and for removing said routing information from a packet outputted from said switch means and applied thereto, said routing information being determined in accordance with the first virtual channel identifier included in the input packet, and said interface means composing a part of each of said label conversion means.

15. A packet switching station according to claim 14, wherein:
- said label conversion means comprises a plurality of first label conversion means respectively provided for said incoming lines and a plurality of second label conversion means respectively provided for said outgoing lines;
- each of said first label conversion means including first table means for storing plural pieces of routing information in correspondence to first virtual channel identifiers assigned for input packets to be received from one of the incoming lines connected to the first label conversion means and first control means for replacing a virtual path identifier included in each input packet received from said one incoming line with the routing information read out from said first table means and for inputting the resultant packet to said switch means; and each of said second label conversion means including second table means as said memory means for storing a plurality of pairs consisting of a virtual path identifier and a second virtual channel identifier in correspondence to internal virtual channel identifiers assigned for said input packets and second control means as said interface means for replacing the internal virtual channel identifier and the routing information included in a packet outputted from said switch means with a pair consisting of the second virtual channel identifier and the virtual path identifier read out from said second table means in correspondence to said internal virtual channel identifier included in said output packet.

16. A packet switching station according to claim 15, wherein:

each of said first table means stores an internal virtual channel identifier together with said routing information in correspondence to each of said first virtual channel identifier;

said first control means replaces the first virtual channel identifier and the virtual path identifier included in said input packet with the internal virtual channel identifier and the routing information read out from the first table means, respectively;

each of said second table means stores said pairs of the virtual path identifier and the second virtual channel identifier in correspondence to said internal virtual channel identifier; and said second control means reads out one of said pairs of the virtual path identifier and the second virtual channel identifier from said second table means in accordance with the internal virtual channel identifier included in the packet outputted from said switch means.

17. A method of communicating a packet in a network which includes a plurality of switching stations, the packet including in its header portion a virtual path identifier for identifying one of a plurality of logical paths multiplexed on one transmission line and a virtual channel identifier for identifying one of a plurality of logical connections multiplexed on one logical path, said method comprising:

a first step of designating, by virtue of a first control packet transmitted from a first one of said switching stations to a second one of said switching stations for setting a logical connection therebetween, a first virtual channel identifier to be given to information packets transmitted from said second station to said first station;

a second step of designating, by virtue of a second control packet transmitted from said second station to said first station for setting up a logical connection therebetween, a second virtual channel identifier to be given to information packets transmitted from said first station to said second station; and a third step of communicating information packets between said first and second stations by giving each information packet the first or second virtual channel identifier designated by the receiving of said two stations.

18. A packet switching station for communicating with other stations connected thereto by packets each including in its header portion a virtual path identifier and a virtual channel identifier, said switching station comprising:

a switching means having a plurality of input lines and output lines and operating to switch a packet inputted on any one of said input lines to one of said output lines in accordance with routing information included in said packet;

a plurality pairs of incoming lines and outgoing lines for respectively connecting said switching means to other stations;

a plurality of interface means each provided for every pair of said incoming and outgoing lines to convert the header portion of a packet received from said incoming lines or one of said output lines of said switching means connected thereto and to apply the converted packet to one of said input lines of said switching means or one of said outgoing lines; and control means for controlling a call processing, said control means being connected to said switching means via one of said input lines and one of said output lines and having means for generating a call control packet to be transmitted to one of said other stations through said switching means in order to set up a call between the switching station and said one station, said control packet including information to designate a virtual channel identifier to be set in each information packet of said call when transmitted from said one station to the switching station.

19. A packet switching station according to claim 18, wherein:

each of said interface means comprises an input side interface connected between one of said incoming lines and one of said input lines and an output side interface connected between one of said outgoing lines and one of said output lines; and said control means further includes means for informing one of said input side interfaces, which has received a control packet for setting up a call from a first one of said other stations, of a first virtual channel identifier designated to said first station and first routing information to specify one of said output lines and for informing one of said output side interfaces, through which a control packet for setting up a call is transmitted to a second one of said other stations, of a second virtual channel identifier designated by said second station.

* * * * *